United States Patent [19]

Wauhop, Jr. et al.

[11] Patent Number: 4,531,304
[45] Date of Patent: Jul. 30, 1985

[54] PRODUCTION OF CONCRETE ARTICLES UTILIZING HEAT-RECLAIMING SYSTEM

[75] Inventors: Billy J. Wauhop, Jr., Belvidere, N.J.; Willard W. Stratz, Bath, Pa.

[73] Assignee: Besser Company, Alpena, Mich.

[21] Appl. No.: 333,622

[22] Filed: Dec. 22, 1981

Related U.S. Application Data

[63] Continuation of Ser. No. 149,683, May 14, 1980, abandoned.

[51] Int. Cl.$^3$ .................................................. F26B 3/04
[52] U.S. Cl. ............................................. 34/30; 34/35; 34/86; 34/211; 34/212; 264/37; 264/82
[58] Field of Search ................. 264/37, 82; 34/35, 86, 34/211, 212, 216, 219, 30

[56] References Cited

U.S. PATENT DOCUMENTS

| | | | |
|---|---|---|---|
| 761,042 | 5/1904 | Gathmann | 34/77 |
| 2,563,408 | 8/1951 | Luzatti et al. | 432/189 |
| 3,957,937 | 5/1976 | Lovell | 264/333 |
| 3,959,422 | 5/1976 | Wilhelm | 264/333 |
| 4,244,904 | 1/1981 | Drain | 264/82 |

*Primary Examiner*—Larry I. Schwartz
*Attorney, Agent, or Firm*—Robert E. Burns; Emmanuel J. Lobato; Bruce L. Adams

[57] ABSTRACT

A method of producing concrete articles comprises reclaiming a portion of the heat energy from the kiln atmosphere during the curing of the concrete articles, and then utilizing the reclaimed heat energy to pre-heat mixing water used to form other concrete articles, or to add to boiler feed water used to generate low pressure steam, or both. In the case where two or more kilns are operated simultaneously at staggered curing cycles, the high temperature kiln atmosphere from the kiln undergoing cool down is intermixed with the low temperature kiln atmosphere from the kiln undergoing heat up thereby reclaiming heat energy from one kiln and using it in the other kiln thereby reducing the total energy consumption required for curing.

13 Claims, 14 Drawing Figures

PRODUCTION OF CONCRETE ARTICLES UTILIZING HEAT-RECLAIMING SYSTEM

This is a continuation of application Ser. No. 149,683, filed May 14, 1980, now abandoned.

FIELD OF INVENTION

The present invention relates generally to the production of concrete articles, and more particularly to a method of recovering and utilizing heat energy used during the curing of the concrete articles so as to reduce the total energy consumption required to cure other concrete articles.

BACKGROUND OF INVENTION

In the production of concrete articles, concrete aggregates and mixing water are mixed together to form concrete from which is manufactured concrete articles. After manufacture, the concrete articles must be cured and as well known in the art, the term "curing" refers to the time during which hydration or hardening of the cement takes place through chemical reaction between the cement and water during which the newly formed (green) concrete articles acquire their strength. Many types of curing techniques have been developed and at present, in the concrete block industry, the most widespread technique is low pressure steam curing. In the low pressure steam system, the green concrete articles are loaded into a kiln after which a sufficient quantity of steam is injected directly into the kiln to heat the internal kiln atmosphere to the designed temperature while, at the same time, maintaining a high degree of saturation thereby providing the combination of heat and moisture which accelerates the hydration and hardening of the cement.

One drawback of the low pressure steam system is that considerable energy is required to generate the steam which, in most low pressure steam systems, is maintained at a temperature on the order of 160°–200° F. It has been found that considerable heat energy is consumed in heating up the kiln surfaces (walls, roofs, floors, etc.), in heating up the steel pallets on which the block is stacked, and in heating up the steel racks which, if used, support the pallets in the kiln. In addition, heat energy is lost to the outside air due to conduction through the kiln walls and roof. Also, heat energy is required to heat up the volume of air within the kiln itself. In view of the continually escalating cost of fuel, careful consideration is being given to ways in which to conserve energy in not only the curing phase but in the entire process of concrete block production.

SUMMARY OF INVENTION

It is therefore, a primary object of the present invention to provide a method of production of concrete articles which requires less energy consumption than the methods presently being used.

It is another object of the invention to provide a heat-reclaiming system for reclaiming heat energy used during the curing of concrete articles and utilizing the reclaimed heat energy in the production of other concrete articles thereby lowering the total energy consumption required to produce concrete articles.

Another object of the invention is to provide a method of producing concrete articles in which, during the cool-down phase of curing, the high temperature kiln atmosphere is recirculated through a heat exchanger to remove therefrom heat energy which is utilized in the subsequent production of other concrete articles.

A still further object of the invention is to provide a method of producing concrete articles utilizing two or more kilns for curing and in which the high temperature kiln atmosphere from one kiln is recirculated and intermixed with the low temperature kiln atmosphere of another kiln thereby reclaiming heat energy from the kiln being cooled down and utilizing the reclaimed heat energy in the kiln being heated up.

The above and other objects are achieved in accordance with the invention by reclaiming a portion of the heat energy from the kiln atmosphere during the curing of the concrete articles, and then utilizing the reclaimed heat energy to preheat mixing water used to form other concrete articles, or to add to boiler feed water used to generate low pressure steam, or both. In the case where two or more kilns are operated simultaneously at staggered curing cycles, the high temperature kiln atmosphere from the kiln undergoing cool down is intermixed with the low temperature kiln atmosphere from the kiln undergoing heat up thereby reclaiming heat energy from one kiln and using it in the other kiln thereby reducing the total energy consumption required for curing.

Having in mind the foregoing and other objects, features and advantages of the invention which will be evident from an understanding of this disclosure, the present invention comprises the method of producing concrete articles as illustrated in the presently preferred embodiments which are hereinafter set forth in sufficient detail to enable those persons skilled in the art to clearly understand the function, operation and advantages of the invention when read in conjunction with the accompanying drawings.

DESCRIPTION OF PREFERRED EMBODIMENTS

Two embodiments of the invention will be described with reference to the application drawings and for ease of description, the invention will be described with reference to systems having one or two kilns. The principle of the invention can, of course, be carried out with any number of kilns as will be apparent from the following description. The invention will also be described with reference to curing concrete blocks and it is understood that the invention is not limited to block curing and is applicable to curing all types of concrete articles. In the United States, the majority of concrete block curing is done by low pressure steam so that the invention will be described with respect to this curing technique.

Figure 1:
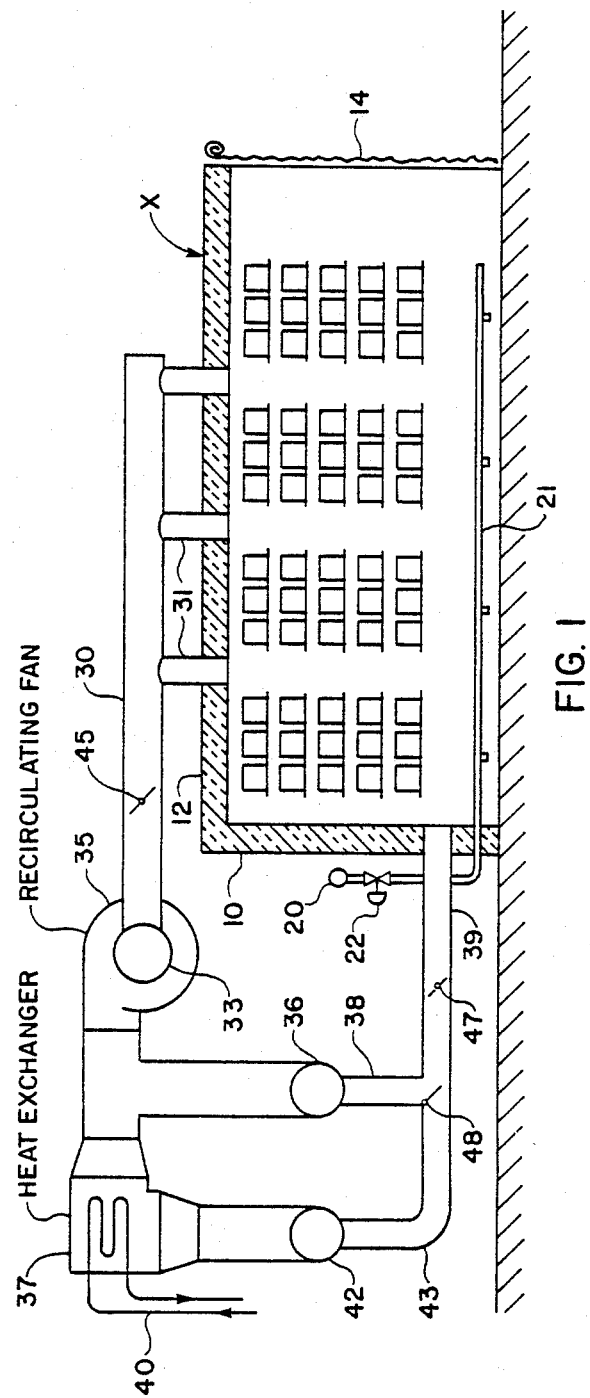
FIG. 1 is a schematic side elevational view, partly in section, of a kiln equipped with the heat-reclaiming system of the invention.

As shown in FIG. 1, a kiln X of conventional construction has a wall portion 10 covered by a roof portion 12 and is dimensioned to receive vertical stacks of pallets containing green blocks to be cured. The front of the kiln is provided with a kiln door 14 which, in the embodiment shown, comprises a roll-up canvas door. For sake of clarity, the kiln X has been shown primarily in outline form as the particular kiln construction is immaterial to the present invention.

In order to supply low pressure steam to the kiln, a steam header 20 is connected at one end to a boiler (not shown). One or more steam lines 21 branch off of the steam header 20 and extend along the length of the kiln. The steam lines 21 have a series of spaced apart nozzles for injecting steam into the kiln to heat the internal kiln atmosphere to the desired temperature and to provide the necessary moisture to accelerate hydration and hardening of the cement. The steam is preferably injected into the kiln by bubbling it through a trough of water thereby enabling the steam to pick up additional moisture content from the water to help maintain the internal kiln atmosphere at a relative humidity of between 90%–100%. The bubbling of the steam through water also avoids creation of a superheated steam condition which is disadvantageous in that superheated steam could cause a moisture or hydration reduction state within the green blocks. In order to regulate the injection of steam into the kiln, a valve 22 is inserted in the steam line 21.

In accordance with the invention, a heat-reclaiming system is provided for reclaiming some of the heat energy expended during curing of the block and the reclaimed heat energy is then used in the next curing cycle, either in the same kiln or in a neighboring kiln, thereby lowing the total consumption of energy needed for curing the block. The heat-reclaiming system comprises an exhaust duct 30 connected to a series of branch exhaust ducts 31 which extend through the kiln roof and open into the kiln interior. The exhaust duct 30 is connected to a header 33 which is connected to the inlet side of a recirculating fan 35. The outlet side of the fan is connected by ductwork to both a fan outlet header 36 and a heat exchanger 37. The header 36 is connected through ducts 38 and 39 to the interior of the kiln to enable recycling of the kiln atmosphere through the loop formed by the branch exhaust ducts 31, the exhaust duct 30, the recycling fan 35, the header 36 and the ductwork 38 and 39. The heat exchanger 37 is of conventional type and includes tubes 40 for circulating water from a water storage tank (not shown) in heat-exchange relationship with the kiln atmosphere exhausted by the fan 35. The inlet side of the heat exchanger 37 is connected through ductwork to the outlet side of the fan 35 and the outlet side of the heat exchanger is connected through a heat exchanger header 42 to a duct 43 which communicates with the duct 39. By such a construction, the heated and moisture-laden kiln atmosphere which is exhausted by the recirculating fan 35 can pass through the heat exchanger 37 wherein heat energy is given up to the water flowing through the tubing 40 and the cooled kiln atmosphere then flows through the header 42 and duct 43 into the duct 39 for reentry into the kiln. In addition, some of the moisture contained in the kiln atmosphere condenses on the tubing 40 and is collected and fed to the boiler feed water tank as hot water for use as boiler water make-up.

A set of dampers are provided within the ductwork of the heat-reclaiming system for controlling the manner of flow of the kiln atmosphere during operation of the kiln. A damper 45 is disposed in the exhaust duct 30 and a similar damper 47 is mounted in the duct 39, and both dampers are adjustably movable between open and closed positions to regulate flow through their respective ducts. Another damper 48 is pivotably mounted at the intersection of the duct 43 with the duct 39 for regulating the flow of the exhausted kiln atmosphere through the heat-reclaiming system and back into the kiln through the duct 39. The damper 48 is movable between one position wherein the damper closes the duct 43 thereby communicating the ducts 38 and 39 and another position wherein the damper closes the duct 38 thereby communicating the ducts 39 and 43. Though not shown in the drawings, the set of dampers can be mechanically interconnected for common operation.

A description will now be given of the mode of operation of the heat-reclaiming system with respect to one curing cycle carried out in the kiln X. Initially, the kiln is empty, and green concrete blocks to be cured are charged into the kiln. In the event cured blocks were previously unloaded from the kiln, the kiln interior surfaces may be at a temperature in the range of 120°–140° F. and when empty, the kiln would normally have a low humidity condition on the order of 50%–60% relative humidity. After loading of the green blocks into the kiln, which would take from 45 minutes to two hours, the kiln door 14 is closed thereby sealing the kiln interior.

As well known in the art, different types of cement require different pre-set periods before high temperature can be applied to accelerate the hydration or curing of the cement. During the pre-set period, high humidity low pressure steam is injected into the kiln by opening the steam valve 22 and permitting steam to flow through the steam line 21 from which it is bubbled through a water trough into the kiln. During this period, the dampers 45 and 47 are closed and the recirculating fan 35 is off. Throughout the pre-set period, the humidity condition throughout the kiln is maintained in the range of 90%–100% relative humidity. After the pre-set period, the steam input is controlled to raise the kiln atmosphere to an accelerated temperature of about 160°–200° F. at a rate of about 30° F./hour and again, the steam is bubbled through water to assure that the kiln atmosphere maintains 90%–100% relative humidity during this portion of the curing cycle. After the final accelerated curing temperature is reached, the supply of steam is terminated to allow the kiln to soak for a period of some six-ten hours.

Following the soaking period, the recirculating fan 35 is turned on, the dampers 45 and 47 are opened, and the damper 48 is positioned to close the duct 38 thereby permitting withdrawal of the kiln atmosphere through the exhaust ducts 30, 31, and the withdrawn kiln atmosphere passes through the heat exchanger 37 where it undergoes a reduction in temperature and humidity level and then the cooler and dryer kiln atmosphere is re-introduced back into the kiln through the ducts 43 and 39. The heat and water which are removed from the kiln atmosphere are stored in the water for use as boiler feed water for the next curing cycle and as mixing water for the manufacture of the next batch of concrete blocks. During this heat-reclaiming period, the total kiln temperature (block, pallets, kiln surfaces, etc.) is reduced to a level of 120°–140° F. and the kiln atmosphere is reduced to a low humidity whereby the kiln door 14 can be opened and the kiln unloaded by conventional manual means or automated fork lift truck. The reclaimed heat energy is used in the next curing cycle resulting in a lower total consumption of energy for curing concrete block.

Thus the total curing process allows for controlled pre-setting of the concrete block before accelerating the temperature to the final curing temperature. The curing process utilizes a final curing temperature on the order of 160°–200° F. which is advantageous from the standpoint of achieving early high compressive strengths as well as allowing for the inclusion of fly ash (Pozzolan) as part of the cementacious material resulting in a lower per unit material cost. Further, the process reclaims much of the energy required for an accelerated ultimate high temperature level and supplies this reclaimed heat energy to the subsequent concrete block to be cured as either hot mixing water or to the boiler feed water supply to reduce the energy needed to generate the steam. Thus the heat-reclaiming system achieves energy conservation since the subsequent concrete blocks are preheated by the reclaimed heat energy extracted by the heat exchanger 37. In this embodiment, the extracted heat energy is in the nature of heated water which can be used as hot mixing water for the next batch of concrete block or as boiler feed water, or both, thereby reducing the amount of heat energy needed for the next curing cycle. Alternatively, the extracted heat energy can be used to furnish heat to the manufacturing building.

The heat-reclaiming system of the invention can also be used with two or more kilns to obtain even greater energy conservation. FIGS. 2–5 show the system being used in connection with two kilns X and Y and in each figure, the corresponding temperature-time curve is shown alongside its respective kiln. The representations in FIGS. 2A, 3A, 4A and 5A are diagrammatic and are in the nature of top plan views as opposed to FIG. 1 which is in the nature of a side elevational view.

Figure 2A:
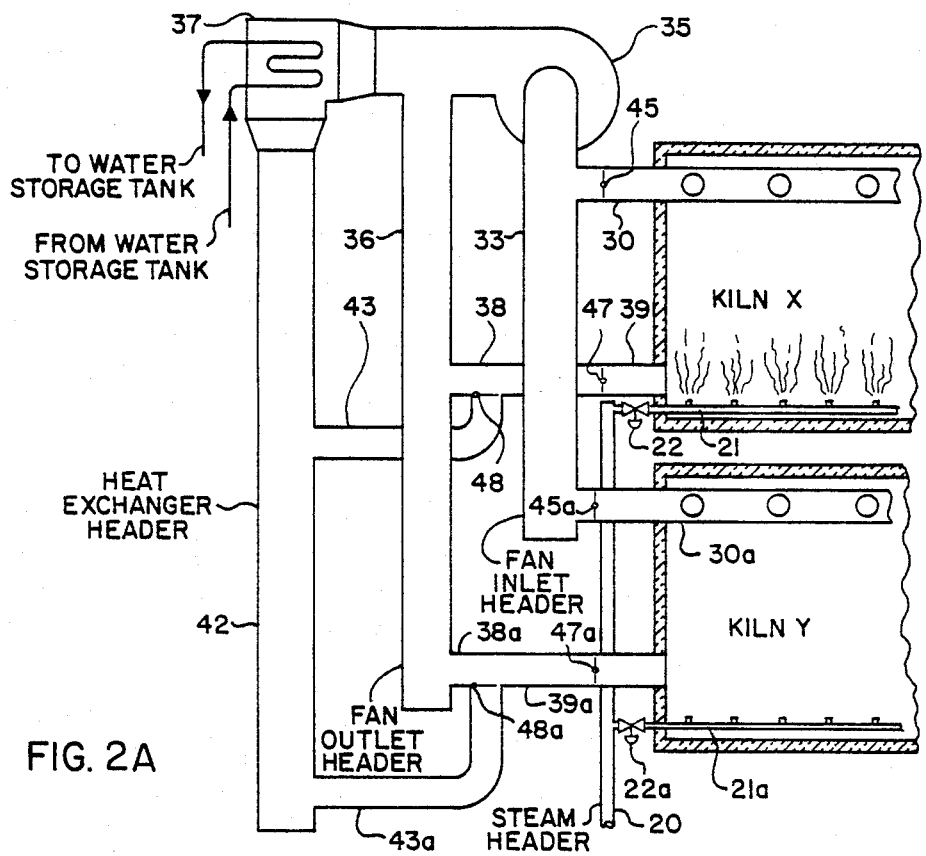
FIGS. 2A, 3A, 4A and 5A are schematic top plan views, partly in section, of the heat-reclaiming system used in conjunction with plural kilns
Figure 2B:
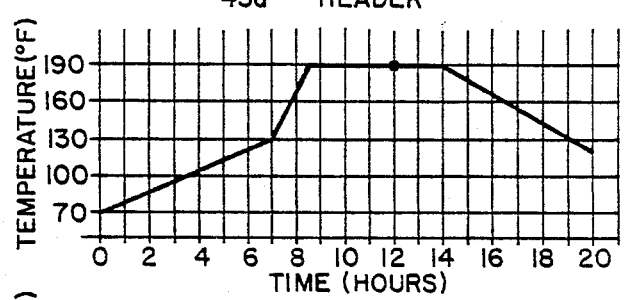
FIGS. 2B, 2C, 3B, 3C, 4B, 4C, 5B and 5C are time-temperature curves of different conditions within the plural kilns.
Figure 2C:
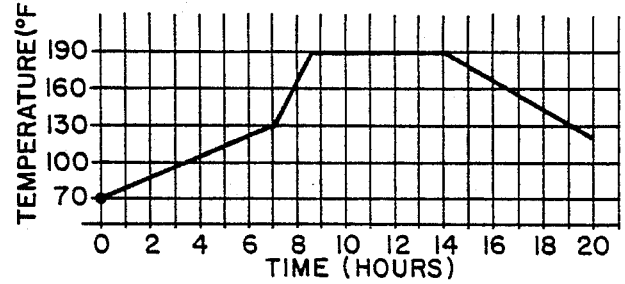

With reference to FIG. 2, and assuming the initial conditions that kiln X is in hour 12 of its curing cycle and kiln Y is just beginning its curing cycle (hour 0), a description will be given as to the manner of operating the heat-reclaiming system using two kilns. In kiln X, the kiln atmosphere is maintained at 190° F. and a relative humidity between 90%–100% by modulating on and off the steam valve 22 and with the dampers 45 and 47 closed and the damper 48 in the position shown. In kiln Y, the green block has just been charged into the kiln which has a kiln atmosphere of about 70° F. and a low relative humidity on the order of 50%–60%. The dampers 45a and 47a are closed and the damper 48a is in the position shown. After the block has been loaded in kiln Y, the relative humidity of the kiln atmosphere is quickly raised to 90%–100% by injecting a controlled amount of steam through the water trough. FIGS. 2B and 2C show the temperature conditions within the respective kilns at this point in time.

Figure 3A:
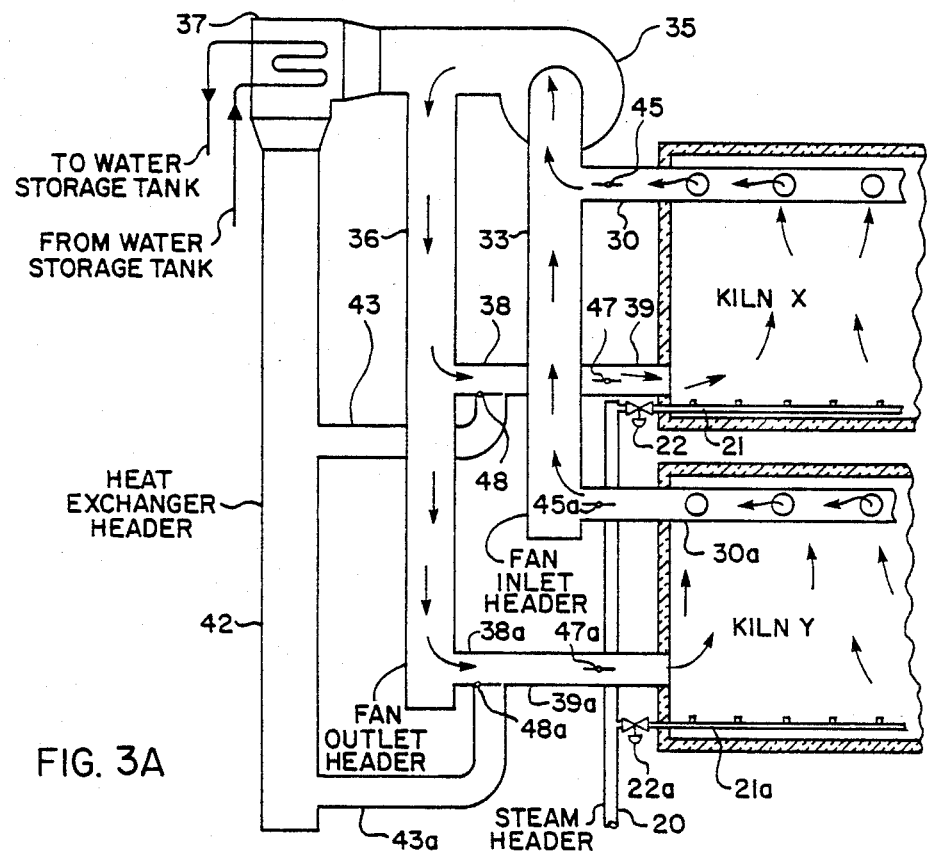
Figure 3B:
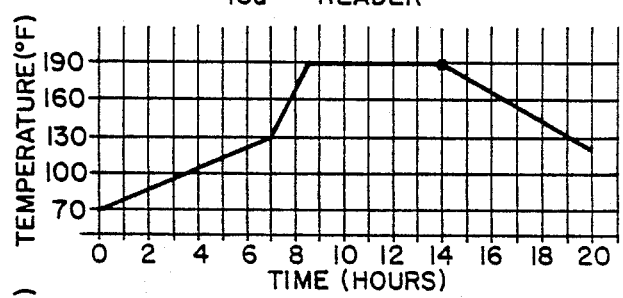
Figure 3C:
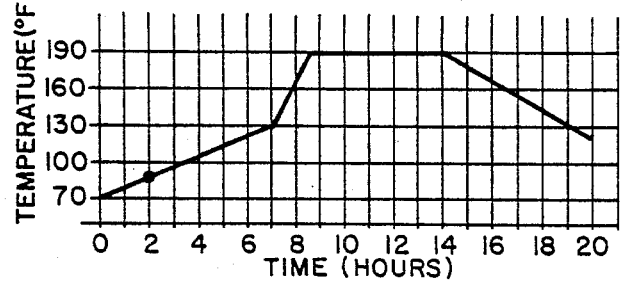

FIG. 3 shows the conditions two hours later when the soaking period in kiln X has been completed and when the pre-set period of the block in kiln Y has been completed. At this time, the heat-reclaiming system is activated. The recycling fan 35 is turned on in conjunction with the opening of the dampers 45 and 47 leading to kiln X and the opening of the dampers 45a and 47a leading to kiln Y. The fan withdraws the high temperature and high humidity atmosphere from kiln X and withdraws the low temperature and low humidity atmosphere from kiln Y and the two kiln atmospheres are intermixed in the fan outlet header 36 and recycled back to both kilns. In this fashion, some of the heat energy from the atmosphere in kiln X is transferred to the atmosphere in kiln Y.

Figure 4A:
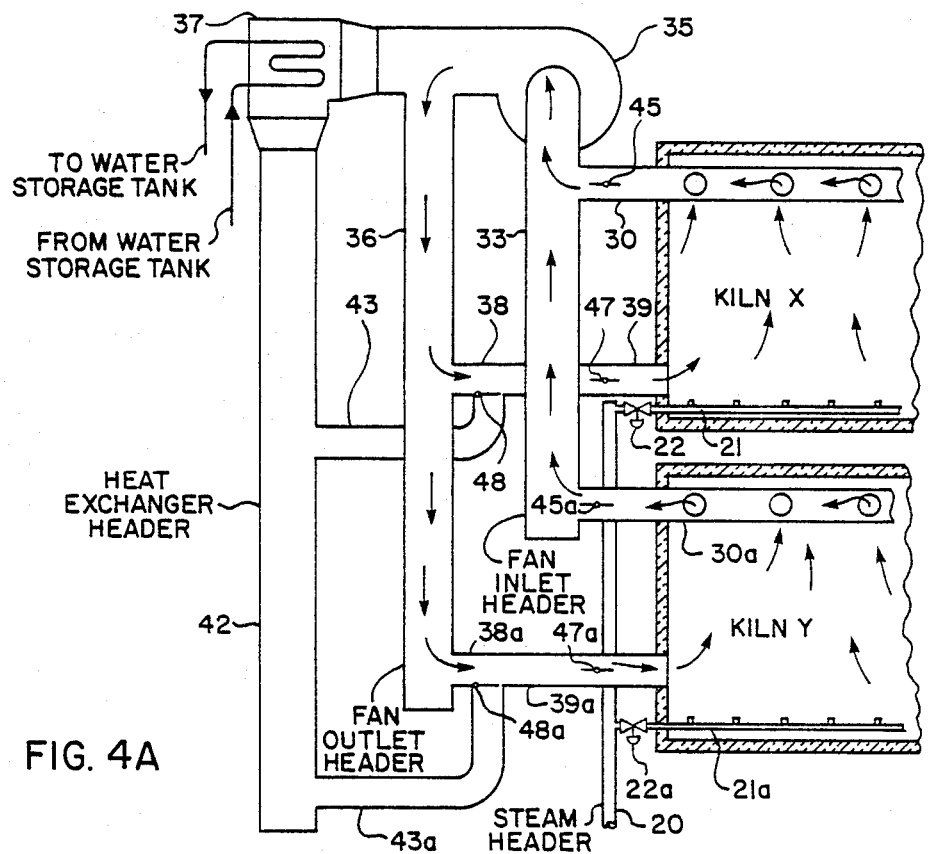
Figure 4B:
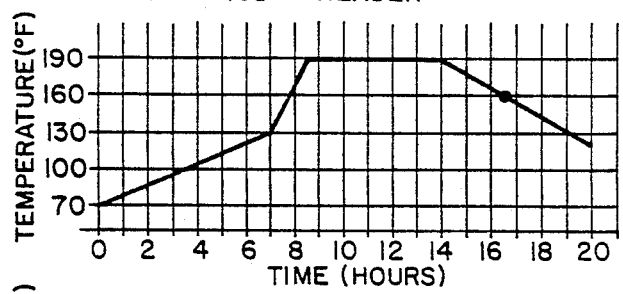
Figure 4C:
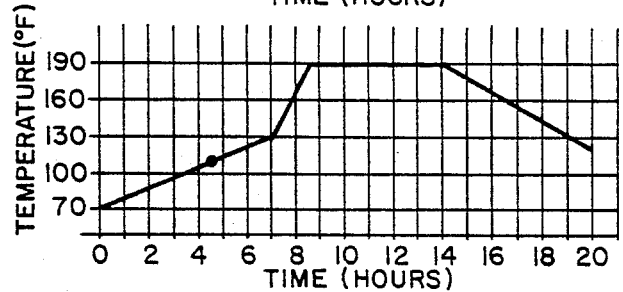

The heat-reclaiming system continues this mode of operation for several hours during which time the kiln X undergoes a cooling down as its kiln atmosphere is mixed with the cooler kiln atmosphere from kiln Y. Kiln Y, on the other hand, undergoes a heating up as its relatively cooler atmosphere is mixed with the hotter atmosphere from kiln X. This condition is shown in FIG. 4 which shows in FIGS. 4B and 4C the respective temperatures in kilns X and Y at a time two and one-half hours later than that shown in FIG. 3. This mode of operation is continued until the two kilns substantially reach temperature equilibrium, or as close thereto as possible, after which no further heat conservation can be obtained in this mode of operation.

Figure 5A:
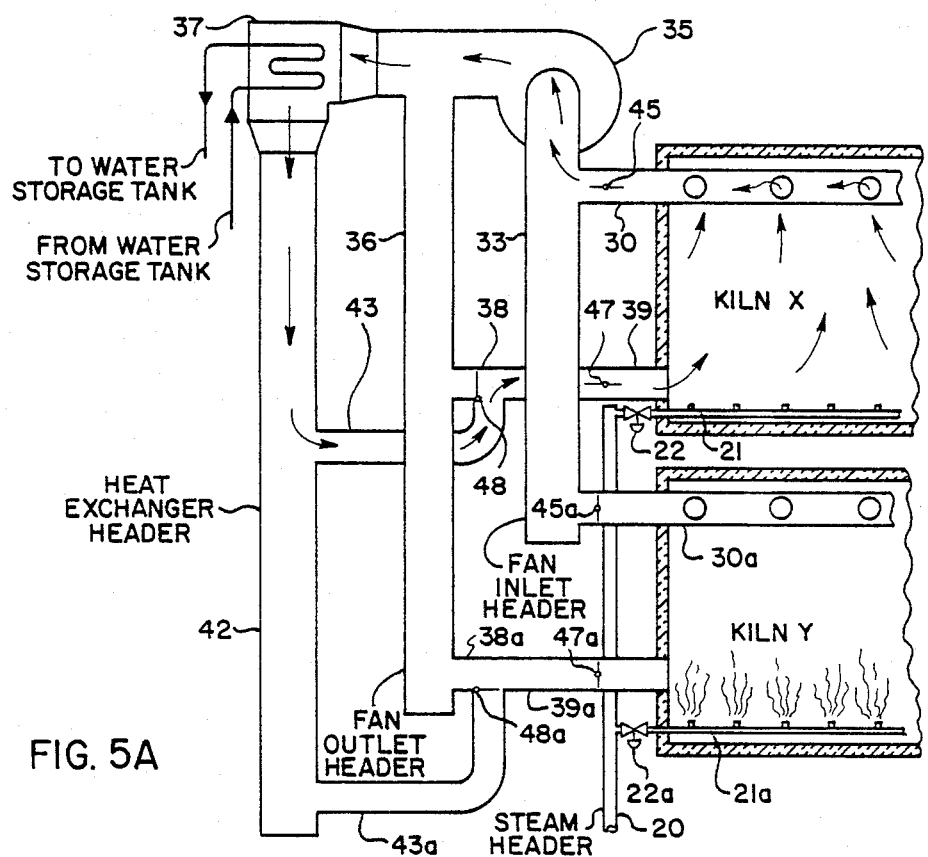
Figure 5B:
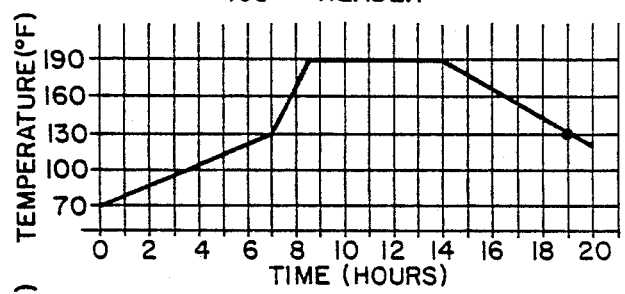
Figure 5C:
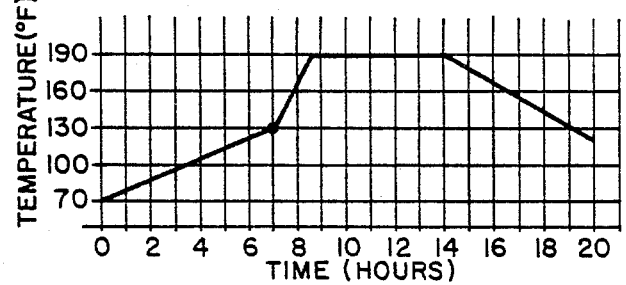

As shown in FIG. 5, when the kiln atmosphere in both kilns X and Y reaches approximately 130° F., the heat-reclaiming system undergoes a second mode of operation. In this second mode, the dampers 45 and 47 remain open; however, the damper 48 is moved into the position shown so as to close the duct 38 thereby communicating the duct 43 with the duct 39 so that the atmosphere exhausted from the kiln X passes through the heat exchanger 37 and is then re-introduced into kiln X. In this manner, the atmosphere exhausted from kiln X will be cooled and dried in the heat exchanger 37 before being returned to kiln X thereby lowering the temperature and humidity within kiln X before the kiln door is open to unload the kiln. At the same time, the dampers 45a and 47a are closed while the damper 48a remains in the position shown, and the steam valve 22a is opened to permit low pressure steam to bubble through the water trough into the kiln Y so that the kiln reaches its final accelerated curing temperature of 190° F. Thus, when kiln Y has gained all of the possible heat recovery available from kiln X, additional heat energy is supplied by the low pressure steam. In the meantime, the heated water obtained from the heat exchanger 37 is conserved and used as pre-heated mixing water for subsequent concrete block to be manufactured or as boiler feed water for subsequent steam generation.

Figure 6:
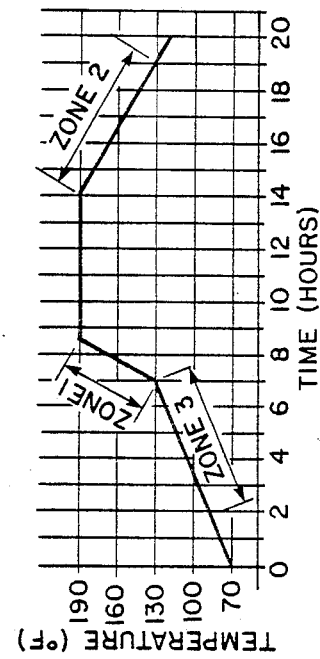
FIG. 6 is an explanatory time-temperature curve useful in explaining the energy savings achieved by the invention.

The heat energy saving achieved by the heat-reclaiming system can be seen from the time-temperature curve of FIG. 6. During operation of kilns X and Y, the heat energy added in zone 1 is reclaimed in zone 2 and added to the adjacent kiln during its heat-up in zone 3. It is understood that more than two kilns can be operated in this manner and the showing of two kilns was done for ease of description.

While the invention has been described with reference to two preferred embodiments, it is understood that many modifications thereof and changes thereto will become apparent to those ordinarily skilled in the art and the present invention is intended to cover all such obvious modifications and changes which fall within the spirit and scope of the invention as defined in the appended claims.

What I claim is:

1. A method of reclaiming heat energy in the production of concrete articles produced by the steps of mixing together concrete aggregates and mixing water to form concrete; manufacturing concrete articles from the concrete; and curing the concrete articles in a kiln by allowing the concrete articles to pre-set during a pre-set period, heating up the pre-set concrete articles while maintaining the kiln atmosphere in a high humidity condition, maintaining the heated-up concrete articles at elevated temperature and high humidity during a soaking period, and then cooling down the heated and soaked concrete articles while in the kiln, the improvement comprising: reclaiming a portion of the heat energy from the kiln atmosphere by extracting heat energy therefrom after the concrete articles reach their maximum curing temperature by recirculating the kiln atmosphere in heat-exchange relationship with water so that the high temperature and high humidity kiln atmosphere gives up some of its heat energy to the water thereby heating up the water, and utilizing the reclaimed heat energy contained in the thusly heated water in the subsequent production of other concrete articles thereby lowering the total energy consumption required to cure the subsequently produced other concrete articles.

2. A method of reclaiming heat energy according to claim 1; wherein the reclaimed heat energy is utilized by applying the heated water to boiler feed water to thereby pre-heat the boiler feed water.

3. A method of reclaiming heat energy according to claim 1; wherein the reclaimed heat energy is utilized by applying the heated water to mixing water used to form concrete to thereby pre-heat the mixing water.

4. A method of reclaiming heat energy according to claim 1; wherein the reclaiming step is carried out during the cooling down of the heated and soaked concrete articles.

5. A method of reclaiming heat energy according to claim 1; wherein the recirculation of the kiln atmosphere in heat-exchange relationship with water comprises recirculating the kiln atmosphere in indirect heat-exchange relationship with the water.

6. A method of reclaiming heat energy according to claim 1; wherein the utilizing step is carried out outside of the kiln.

7. A method of reclaiming heat energy according to claim 1; wherein the curing step comprises curing the concrete articles in the kiln by use of low pressure steam.

8. A method of reclaiming heat energy according to claim 2; wherein the reclaiming step is carried out during the cooling down of the heated and soaked concrete articles.

9. A method of reclaiming heat energy according to claim 2; wherein the recirculation of the kiln atmosphere in heat-exchange relationship with water comprises recirculating the kiln atmosphere in indirect heat-exchange relationship with the water.

10. A method of reclaiming heat energy according to claim 2; wherein the curing step comprises curing the concrete articles in the kiln by use of low pressure steam.

11. A method of reclaiming heat energy according to claim 3; wherein the reclaiming step is carried out during the cooling down of the heated and soaked concrete articles.

12. A method of reclaiming heat energy according to claim 3; wherein the recirculation of the kiln atmosphere in heat-exchange relationship with water comprises recirculating the kiln atmosphere in indirect heat-exchange relationship with the water.

13. A method of reclaiming heat energy according to claim 3; wherein the curing step comprises curing the concrete articles in the kiln by use of low pressure steam.

* * * * *